UNITED STATES PATENT OFFICE.

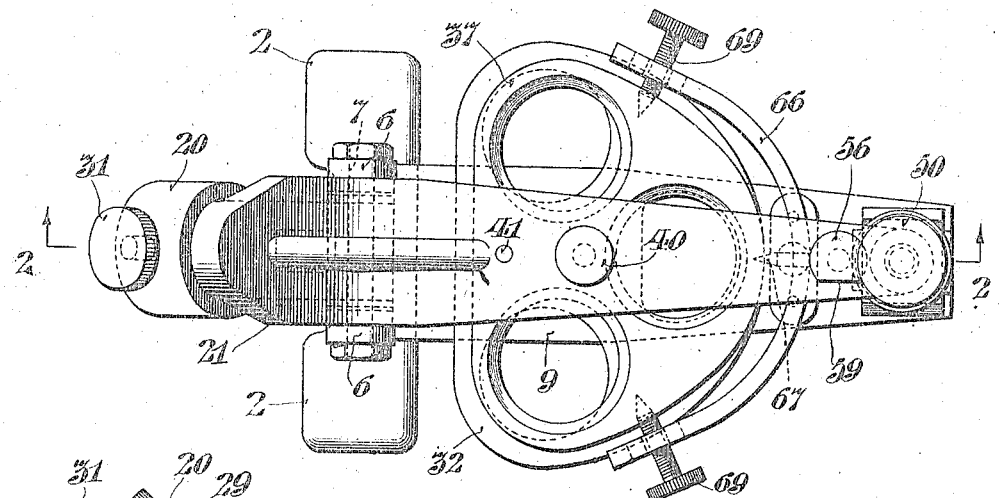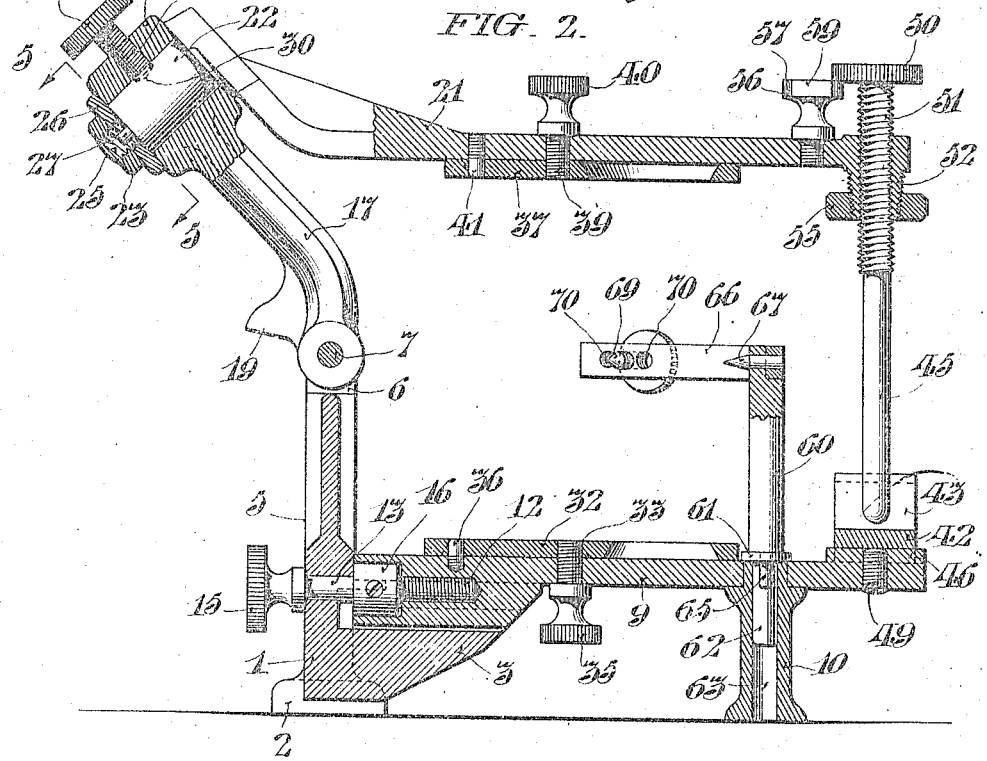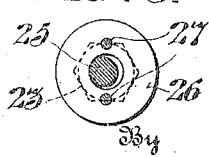

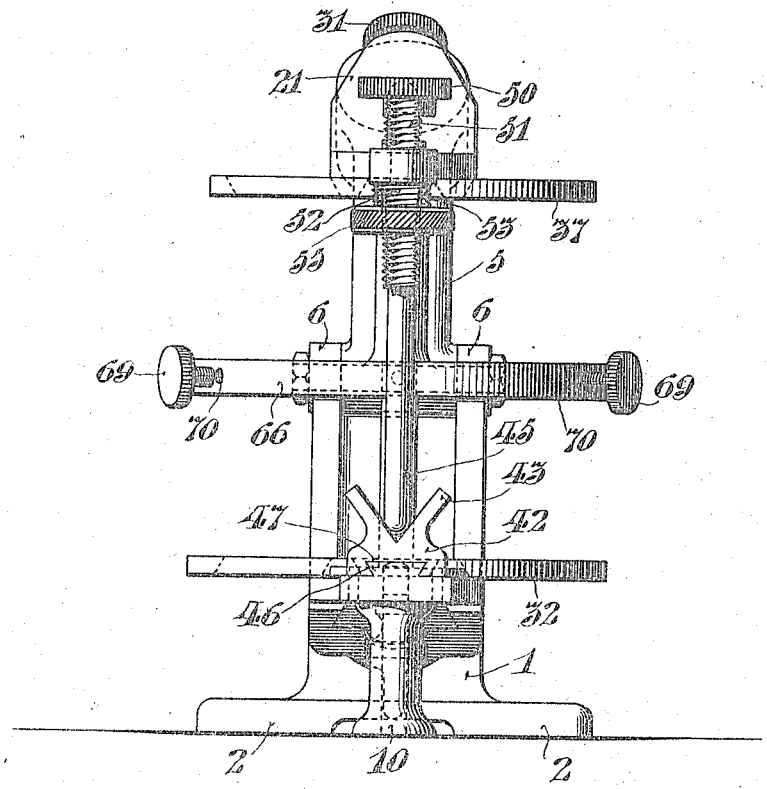
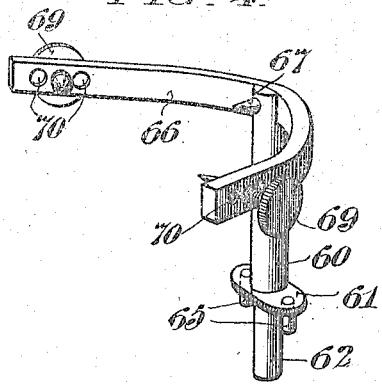

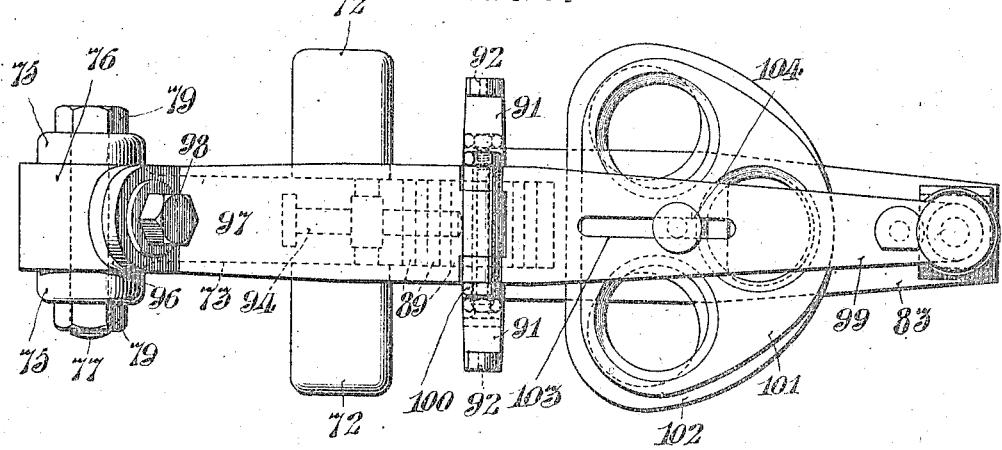
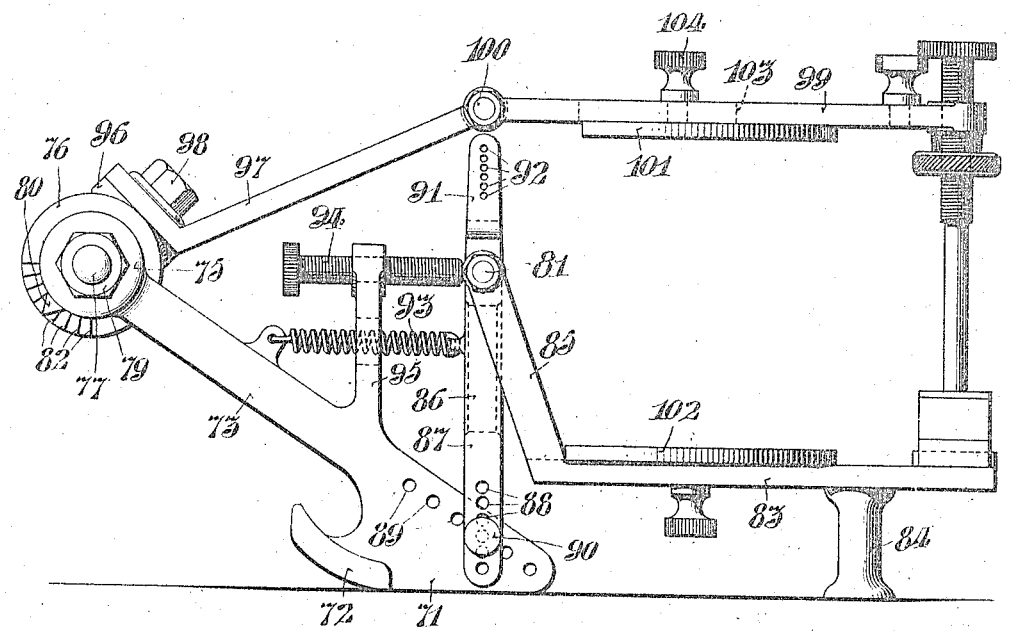

RUPERT E. HALL, OF PHILADELPHIA, PENNSYLVANIA.

DENTAL ARTICULATOR.

1,271,161. Specification of Letters Patent. Patented July 2, 1918.

Application filed March 30, 1917. Serial No. 158,518.

*To all whom it may concern:*

Be it known that I, RUPERT E. HALL, a citizen of the United States, residing at Philadelphia, in the county of Philadelphia, State of Pennsylvania, have invented certain new and useful Improvements in Dental Articulators, of which the following is a specification, reference being had to the accompanying drawings.

My invention relates particularly to that class of devices which are commonly known as articulators, and which are adapted to support sets of artificial teeth in such relation that they may be relatively moved so as to simulate the natural masticatory movements of the teeth carried by the human jaw.

The principal objects of my invention are, to provide a dental articulator comprising mechanism that will not only reproduce with precision the natural relative masticatory movements of the human jaw, but which may be so adjusted as to accurately coincide with the measurements and conditions that may be found in each individual patient.

Other objects of my invention are, to provide means for relatively shifting the jaw model holders longitudinally to produce any desired degree of overbite; to provide means whereby the jaw models may be hingedly moved toward and from each other, and to provide means for guiding said movements in predetermined angles with respect to the occlusal plane.

My invention further comprehends means arranged to establish the correct triangular or anatomical relation of the casts or jaw models to the external occipital protuberance and the glenoid fossæ.

Specifically stated the form of my invention as hereinafter described comprises upper and lower jaw model holders hingedly connected, and arranged to be relatively moved about an axis oblique to the occlusal plane, and includes means whereby said oblique axis may be variably disposed at different angles with respect to said occlusal plane.

My invention also includes all of the various novel features of construction and arrangement as hereinafter more definitely described.

In the accompanying drawings Figure 1, is a plan view of an articulator constructed in accordance with my invention; Fig. 2, is a central vertical longitudinal sectional view of said articulator, taken on the line 2—2 in Fig. 1, certain parts being shown in elevation for convenience of illustration; Fig. 3, is a front elevational view of the articulator shown in Figs. 1 and 2; Fig. 4, is a perspective view of the jig shown in Figs. 1, 2, and 3, adapted to determine the position of the jaw models in said articulator; Fig. 5, is a sectional view taken on line 5—5 of Fig. 2, Fig. 6, is a plan view of a modified form of articulator; and Fig. 7 is a side elevational view of the articulator shown in Fig. 6.

In the form of my invention shown in Figs. 1 to 4 inclusive, the base 1, has the laterally extended feet 2, the forwardly extended bracket 3, and the upwardly extended standard 5, terminating in relatively spaced bearing lugs 6, through which the hinge-shaft 7 extends.

The bracket 3, serves to slidably support the inner end of the lower jaw model holder 9, which is provided near its forward end with the supporting leg 10, and which is arranged to be adjusted longitudinally toward and away from the standard 5, by the adjusting screw 12, which is in threaded engagement with said jaw model holder 9, and loosely extends through the standard 5.

The shank 13 of the adjusting screw 12 is provided with the knurled head 15 and the collar 16 forming shoulders which bear upon the opposite sides of the standard 5 and prevent the axial movement of the adjusting screw 12, so that when rotated the lower jaw model holder 9, will be shifted thereby longitudinally with respect to the base 1.

The hinge-shaft 7 hingedly carries the upwardly and rearwardly inclined bearing support 17 which is provided with the stop lug 19 arranged to engage the standard 5 to limit its opening movement, and has the bearing head 20 at its free end. Said support 17 carries the upper jaw model holder 21 which is provided with a trunnion 22 rotatably mounted in the bearing head 20, with its axis disposed in oblique relation to the plane of occlusion of the jaw models which may be carried by the articulator.

The trunnion 22 is prevented from accidental displacement from the bearing head 20 by the nut 23 which is in threaded engagement with the threaded extension 25 projecting axially from the trunnion 22. In order that the nut 23 may not be accidentally loosened by the oscillation of the trunnion in its bearing, a washer 26 is interposed between said nut 23 and the face of said bearing, and the trunnion 22 provided with projections 27 extending into corresponding apertures in the washer whereby said washer is caused to be oscillated with said trunnion.

The jaw model holders 9 and 21 may be prevented from relative lateral movements by the set screw 29, which extends through the bearing head 20, in threaded engagement therewith and is arranged to project into a suitably provided recess 30 in the cylindrical wall of said trunnion, with which it may be engaged or disengaged by rotation of its knurled head 31.

The lower jaw model holder 9 is provided with the removably mounted jaw model mounting 32 removably secured thereto by the thumb screw 33 having the knurled head 35, and prevented from accidental rotation by the dowel pin 36 which extends into a suitably provided aperture in the mounting and maintains said mounting in proper alinement with the longitudinal axis of the articulator.

The upper jaw model holder 21 is similarly provided with the removably mounted jaw model mounting 37 removably secured thereto by the thumb screw 39 having the knurled head 40, and prevented from rotation thereon by the dowel pin 41.

It will be seen that the opposed jaw models that may be carried by the respective jaw model holders 9 and 21 may be relatively moved laterally about the inclined axis of the trunnion 22, and that they may be separated or caused to approach by swinging upon the axis of the hinge shaft 7, this affords a compound relative movement of the jaws models.

In order that this compound movement shall be in uniform path a guide 42 is provided, which is removably mounted upon the lower jaw model holder 9 and comprises the longitudinally extended V-shaped trough formed by upwardly diverging wings 43 respectively disposed at a predetermined angle to the medial longitudinal plane of the articulator.

The walls of the trough formed by the wings 43 serve to guide the free end of the depending pin 45 which is adjustably mounted in and normally supports the upper jaw model holder 21, with its free end resting in the bottom of the trough as shown in the drawings, it being noted that any movement laterally of the upper jaw model holder 21 necessitates the coöperation of the pin 45 with said walls. This it will be seen effects a natural chewing action and insures the grinding of the teeth cusps to the angle best adapted for mastication.

The guide 42 is removably engaged with the lower jaw model holder 9 by a dove-tail connection comprising a longitudinally extended laterally undercut rib 46 fitting into a corresponding slot 47 in the bottom of said guide. The guide 42 is arranged to be engaged with the lower jaw model holder 9 by sliding it inwardly from the front and may be secured thereto by the set screw 49, as best shown in Fig. 2; and said guide may conveniently be replaced by other guides whose wings bear a different angular relation.

As shown in Figs. 2 and 3, the pin 45 has a knurled head 50 adjoining its threaded upper portion 51, and extends in threaded engagement through the boss 52 on the outer extremity of the upper jaw model holder 21. Said boss 52 as shown in Fig. 3, is provided with saw-cuts 53 which render it yielding, and its outer tapered surface is threaded to receive the knurled nut 55 which when rotated thereon to drive it in the direction of increasing diameter tends to bind said boss upon the pin 45 and thereby securely hold it against accidental displacement.

It may be desirable under certain conditions to either retract or advance the pin 45, but it is highly advantageous that its normal position be readily determined, and for this purpose a stop is provided in the form of a thumb screw 56 whose knurled head 57 normally extends into the path of the head 50 of the pin 45, to form a stop therefor but said head 57 as shown in Figs. 1 and 2 is cut away to provide a flat side 59 which when presented in the direction of the pin 45 permits the head 50 of said pin 45 to freely pass.

It may be here noted that there has been found some variation in the human skull so that in some instances it may be desirable to vary the angle of inclination of the axis about which the upper jaw model holder oscillates laterally. This may be conveniently accomplished by advancing or retracting the pin 45 or substituting therefor a longer or shorter pin so that, as may be readily seen, said axis may be rocked to a different inclination, about the axis of the hinge-shaft 7.

As the success in operating an articulator is largely dependent upon the absolute accuracy in which the jaw models are mounted in the articulator, a jig is provided for holding the bite in proper position while the jaw models are being built up to join the jaw model mountings. This has been accomplished heretofore with only a limited degree of accuracy, by a device generally known as a face-bow.

The jig comprises a post 60 extending upwardly from the supporting plate 61 which is arranged to rest upon the lower jaw model holder 9 and from which the depending shank 62 extends into the bore 63 of the hollow leg 10. Said plate is also provided with dowel pins 65 which extend into suitable apertures in said lower jaw model holder 9, and prevent the rotation of said post. The upper end of the post 60 carries the bite model supporting bar 66, which is bowed in the plane of occlusion of said bite model, and has the central or medial pointed pin 67 for engaging said bite model at the central incisive point, and the pointed thumb-screws 69 in threaded engagement with the free ends of said bar 66, arranged to be advanced and retracted to engage and disengage the inner part of said bite model.

As clearly illustrated the bar 66, is provided with a series of threaded apertures 70 for the reception of the thumb screws 69 so that denture models of varying sizes and forms may be conveniently supported by the jig.

In the operation of the device the wax bite having been taken and the occlusal plane been determined and indicated thereon it is mounted on the jig, and said jig set in the position shown in the drawings, whereupon the plaster models may be built up to engage the jaw model mountings 32 and 37 for the lower and upper jaw models respectively, whereupon said jig may be withdrawn.

In the form of my invention shown in Figs. 6 and 7 the base 71 has the laterally extended feet 72 and the rearwardly inclined support 73 terminating in a bearing head comprising the spaced bearing lugs 75 between which the hub 76 of the upper jaw model holder support is rotatably adjustable upon the shaft 77 and securely engaged in set position by the nuts 79, the position being determined by the pointer 80 on the bearing lugs 75, and the graduations 82 on the hub 76, as best shown in Fig. 7. By this means the angle of the axis of the pivotal bearing to be hereinafter described, may be varied.

The lower jaw model holder 83 has the supporting leg 84, and the upwardly and rearwardly inclined arms 85 whose free ends are pivotally connected with the upright connecting link 86 which is bifurcated at its opposite ends, the lower bifurcations 87 having a series of apertures 88 disposed longitudinally thereof and arranged to respectively register with a series of similar apertures 89 in the base but disposed in inclined relation so that said link 86 may be adjusted either forward or backward and engaged with the base by the retaining pin 90.

This adjustment is for the purpose of varying the size of the articulator to accommodate dentures of varying size, and in order to preserve the triangular relation that is known to be present in the human skull between the glenoid fossae, the occipital protuberance and the central incisal point, the upwardly extending bifurcations 91 of the link 86, are provided with suitably graduated apertures 92, for connection with a suitable measuring or model setting device such as the device commonly known as a face-bow, the condyle points thereof being inserted in the aperture 92 which corresponds with the registered apertures 88 and 89 in the bifurcations 87, and base 71.

The connecting link 86 is connected with the support 73 by the spring 93 which tends to draw said bar 86 against the adjusting screw 94 which is in threaded engagement with the standard 95. By this arrangement, it will be noted that the lower jaw model may be extended and retracted in opposition to the spring 93, either manually or by the adjusting screw 94.

The hub 76 of the upper jaw model holder support is provided with a bearing boss 96, providing a bearing whose axis is inclined to the occlusal plane and capable of adjustment as above described to vary the angle of inclination.

Said bearing boss 96 oscillatably carries the upper jaw model holder support 97 which is rotatably attached thereto by the tap bolt 98 in threaded engagement with the bearing boss 96.

The upper jaw model holder support 97 hingedly carries the upper jaw model holder 99 which is hingedly connected therewith by the hinge bolt 100, and which carries the upper jaw model mounting 101 in opposition to the lower jaw model mounting 102 on the lower jaw model holder.

Although the hinge bolt 100 affords means for opening the jaw models for inspection, it is to be understood that in the operation of the device, said hinge bolt 100 is to be so tightened as to maintain the support 97 and the upper jaw model holder 99 relatively rigid, so that the relative vertical movement of the jaw models will be about the pivotal axis 81. This as will be readily observed will necessarily cause a rocking action of the base 71, which is curved rearwardly upward to afford a heel upon which it may rock.

In view of the fact that the lower jaw model holder 83 is longitudinally adjustable, and that it is essential that the jaw model mountings should be in registry, the upper jaw model holder 99, is provided with a longitudinally extending slot 103, through which the set-screw 104 extends and may travel to longitudinally adjust the upper jaw model mounting 101 to proper alinement with the opposed lower jaw model mounting 102 when longitudinally adjusted as above described.

I do not desire to limit my invention to the precise details of construction and arrangement as herein set forth as it is obvious that various modifications may be made therein without departing from the essential features of my invention as defined in the appended claims.

Having thus described my invention, I claim:

1. A dental articulator comprising a lower jaw model holder, an upper jaw model holder pivotally connected therewith on an axis inclined with respect to the plane of occlusion, and means adjustable to vary the angle of inclination of said axis.

2. A dental articulator comprising a lower jaw model holder, an upper jaw model holder pivotally connected therewith on an axis inclined with respect to the plane of occlusion, and pivoted means adjustable to vary the angle of inclination of said axis.

3. A dental articulator comprising a lower jaw model holder, an upper jaw model holder pivotally connected therewith and arranged to oscillate with the medial point of the upper jaw model, describing a geodesic line about the surface of a cone, and means arranged to vary the angle of inclination of the axis of relative movement.

4. A dental articulator comprising upper and lower jaw model holders, a hinge joint interposed between said jaw model holders, a pivotal support for said upper jaw model holder, whereby it may be laterally oscillated upon an inclined axis whose angle of inclination may be varied about the axis of said hinge joint.

5. A dental articulator comprising upper and lower jaw model holders, a hinge joint interposed between said jaw model holders, having its axis substantially in the occlusal plane, a pivotal connection between said jaw model holders, whereby they may be laterally oscillated upon an inclined axis whose angle of inclination may be varied about the axis of said hinge joint.

6. A dental articulator comprising upper and lower jaw model holders, a pivotal connection between said jaw model holders having its axis inclined with respect to the plane of occlusion, means to vary the angle of inclination of said axis, and means adjustable to vary the longitudinal relation of said jaw model holders.

7. A dental articulator comprising upper and lower jaw model holders, a hinge joint interposed between said jaw model holders upon which they may be separated, a pivotal connection whereby they may be relatively oscillated upon an adjustable axis inclined to the occlusal plane, a guide on said lower jaw model holder comprising diverging wings, and means depending from said upper jaw model holder, coöperative with said guide to vary the inclination of said axis, and determine the relative movement of said jaw model holders.

8. A dental articulator comprising upper and lower jaw model holders, a hinge joint interposed between said jaw model holders upon which they may be separated, a pivotal connection whereby they may be relatively oscillated upon an adjustable axis inclined to the occlusal plane, a guide on said lower jaw model holder comprising diverging wings, and adjustable means depending from said upper jaw model holder, coöperative with said guide to vary the inclination of said axis, and determine the relative movement of said jaw model holders.

9. A dental articulator comprising upper and lower jaw model holders, a hinge joint interposed between said jaw model holders upon which they may be separated, a pivoted connection whereby they may be relatively oscillated upon an inclined axis adjustable to vary its angle of inclination to the occlusal plane, a guide removably connected with the lower jaw model holder, and a pin coöperative with said guide to direct the relative movements of said jaw model holders.

10. An articulator comprising a base having a standard and forwardly extended bracket, a lower jaw model holder having its inner end slidably supported by said bracket, an adjusting screw rotatably mounted in said base and arranged to advance and retract said lower jaw model holder, a bearing member hingedly carried by said standard, and an upper jaw model holder pivotally carried by said bearing member on an axis oblique to the occlusal plane.

11. An articulator comprising a base having a standard, a lower jaw model holder supported by said base, means arranged to advance and retract said holder with respect to said base, a bearing member hingedly carried by said standard and an upper jaw model holder pivotally supported by said member, to oscillate about an axis inclined to the occlusal plane.

12. An articulator comprising a base having a standard, a lower jaw model holder supported by said base, means arranged to advance and retract said holder with respect to said base, a bearing member hingedly carried by said standard and an upper jaw model holder pivotally supported by said member, to oscillate about an axis inclined to the occlusal plane, and means arranged to lock said upper jaw model holder in rigid relation with said bearing member.

13. An articulator comprising upper and lower jaw model holders arranged to separate upon a horizontal axis disposed substantially in the occlusal plane, and capable of relative oscillation on an axis oblique to the occlusal plane, a guide carried by the lower jaw model holder, and a pin adjustably carried by said upper jaw model holder, coöperative with said guide to direct the relative movements of said jaw model holders.

14. An articulator comprising upper and lower jaw model holders arranged to separate upon a horizontal axis and capable of relative oscillation on an axis oblique to the occlusal plane, a guide carried by the lower jaw model holder, and a pin adjustably carried by said upper jaw model holder, coöperative with said guide to direct the relative movements of said jaw model holders, and a stop arranged to limit the adjustment of said pin.

15. An articulator comprising upper and lower jaw model holders arranged to separate upon a horizontal axis and capable of relative oscillation on an axis oblique to the occlusal plane, a guide carried by the lower jaw model holder, and a pin adjustably carried by said upper jaw model holder, coöperative with said guide to direct the relative movements of said jaw model holders, and a stop arranged to limit the adjustment of said pin when in one position, said stop being rotatable to an alternative position free of said pin.

16. An articulator having upper and lower jaw model holders, and a jig arranged to accurately determine the position of the jaw models and to hold them while being attached to said jaw model holders, comprising a post detachably supported by the lower jaw model holder, and a bowed supporting bar having a plurality of model supporting points disposed in the plane of occlusion.

17. An articulator having upper and lower jaw model holders, and a jig arranged to determine the position of the jaw models, comprising a post removably supported by said lower jaw model holder, a supporting bar carried by said post, bowed in the occlusal plane and having a projection for supporting the jaw models, and a plurality of adjustable model supporting members disposed along said bar.

18. An articulator having upper and lower jaw model holders and a jig arranged to determine the position of the jaw models, comprising a post removably supported by said lower jaw model holder, a supporting bar carried by said post, bowed in the occlusal plane and having a plurality of threaded apertures arranged to receive set screws for supporting the jaw models while being engaged with the jaw model holders.

In witness whereof, I have hereunto set my hand this 28th day of March, A. D. 1917.

RUPERT E. HALL.

Witnesses:
WILLIAM J. RUSSELL,
EDWARD F. SIMPSON, Jr.